(12) United States Patent
Vishnuvajhala et al.

(10) Patent No.: US 8,301,592 B2
(45) Date of Patent: Oct. 30, 2012

(54) SYNCHRONIZING BUSINESS TRANSACTION RECORDS FROM ASYNCHRONOUS MESSAGES RECEIVED OUT OF SEQUENCE

(75) Inventors: Ravikiran Vishnuvajhala, Foster City, CA (US); William Rudge, San Jose, CA (US)

(73) Assignee: Oracle International Corp., Redwood Shores, CA (US)

( * ) Notice: Subject to any disclaimer, the term of this patent is extended or adjusted under 35 U.S.C. 154(b) by 960 days.

(21) Appl. No.: 12/062,386

(22) Filed: Apr. 3, 2008

(65) Prior Publication Data

US 2009/0254921 A1 Oct. 8, 2009

(51) Int. Cl.
*G06F 7/00* (2006.01)
*G06F 17/00* (2006.01)

(52) U.S. Cl. ....... 707/613; 707/607; 707/636; 705/7.26; 705/26.8

(58) Field of Classification Search ........................ None
See application file for complete search history.

(56) References Cited

U.S. PATENT DOCUMENTS

| | | | | |
|---|---|---|---|---|
| 6,505,575 | B1 * | 1/2003 | Ciari | 116/209 |
| 6,813,777 | B1 * | 11/2004 | Weinberger et al. | 725/76 |
| 7,171,613 | B1 | 1/2007 | Alexander et al. | |
| 7,379,903 | B2 * | 5/2008 | Caballero et al. | 705/26.4 |
| 7,590,567 | B2 * | 9/2009 | Hopson et al. | 705/26.81 |
| 7,624,033 | B1 * | 11/2009 | Jean et al. | 705/7.26 |
| 7,865,523 | B2 * | 1/2011 | Caballero et al. | 707/791 |

OTHER PUBLICATIONS

Iyengar, A., et al., "State Transition Diagram of the Order Process," *WebSphere Business Integration Primer : Process Server, BPEL, SCA and SOA*, IBM Press/Pearson plc, 2008, 3 pages. Retrieved on Feb. 4, 2008. Retrieved from: http://safari.oreilly.com/9780137127665/ch08lev1sec2.

Scheer, A., "Interaction diagram of the Business process 'Order processing'," *ARIS—Business Process Frameworks, 2. Ed.*, Springer-Verlag, Berlin, 1998, 1 page.

* cited by examiner

*Primary Examiner* — Loan T Nguyen
(74) *Attorney, Agent, or Firm* — Kilpatrick Townsend & Stockton LLP (57) ABSTRACT

A method for processing business transaction orders received asynchronously. The method includes receiving a first message for a business object, the business object comprising an order between a first party and a second party, and storing the business object including a first entity within a data store. The method further includes receiving a second message for the business object including a second entity, and storing the second entity with the business object. Respective chronological indicators for the first entity and the second entity are examined. Based on the chronological indicators, object attribute metadata describing a current status of the business object is updated, and the business object is processed in accordance with the updated object attribute metadata.

20 Claims, 9 Drawing Sheets

SYNCHRONIZING BUSINESS TRANSACTION RECORDS FROM ASYNCHRONOUS MESSAGES RECEIVED OUT OF SEQUENCE

FIELD

The field of the present invention pertains to the management of electronic commerce operations including the exchange of purchase orders and order updates between business entities.

BACKGROUND

In the world of online commerce, buyers and sellers use a variety of techniques to ensure goods and services meet their mutual expectations. For example, many users have become familiar with the electronic retail experience through a multitude of different e-commerce agents. Such methods and mechanisms for conducting business through electronic means as generally come to be known as electronic commerce.

In general, electronic-commerce, or simply "e-commerce" comprises the buying and selling of products or services over distributed communications networks such as the Internet. With the widespread emergence of the Internet, an increasing variety of business is conducted using e-commerce methods and techniques. E-commerce has spawned new techniques for the management of electronic funds transfer, supply chain management, online transaction processing, inventory management systems, and the like. Modern e-commerce methods widely take advantage of the communications capabilities of the Internet, although a wider range of computer implemented distributed communications networking can be utilized (e.g., such as e-mail, direct communication, etc.).

Electronic commerce that is conducted primarily between businesses is referred to as Business-to-business or B2B e-commerce. B2B can be open to all interested parties (e.g. commodity exchange) or limited to specific, pre-qualified participants (private electronic market). Many companies specialize in providing products or services directly to other companies (e.g., their customers). Such companies are typically referred to as direct sellers, which refers to those companies whereby, upon receiving an order, the seller ships products directly to the customer, wholesaler or manufacturer for delivery. For the direct seller, the goal is to remove intermediaries (e.g., disintermediation) and to establish direct customer relationships. Online intermediaries provide another type of electronic retail experience to customers. Online intermediaries are companies that facilitate transactions between buyers and sellers, such as, for example, brokers. Generally, a broker is a company that facilitates transactions between buyers and a variety of different sellers.

With each of these businesses, advantages are afforded to the customer with respect to enabling the online purchasing to be executed faster and with more responsiveness. Product offerings, order requirements, delivery requirements, prices, and the like can be updated immediately to reflect certain sales or deals. The customer can respond to the pressures and requirements of his respective business by immediately and iteratively updating their purchase orders to their preferred supplier.

There exists a problem however, in the handling of an initial order and updates to that initial order. E-commerce is most commonly implemented within the widely distributed communication systems and networks that comprise the Internet, and involves the interaction between multiple widely separated entities, often in very different time zones. E-commerce transactions between such widely separated entities often involves the asynchronous exchange of messages.

For example, in a case where two trading partners are communicating using messages or business documents with each other (e.g., XML based purchase orders, order acknowledgments, invoices, order updates, etc.), there can be cases where a receiving trading partner might receive the messages for a particular business sales transaction out of sequence. For example, an Order Entry System might send order information to a Shipping System to ship a particular order. The order information is typically an XML based document that contains multiple items/lines. At a later point in time, there can be updates to that order or to its items/lines within the Order Entry System. These updates can be such that the Shipping System needs to be notified about the updates before actually shipping that border out to the end customer. Examples include updates increasing the number of items to be shipped in the order, updates changing the shipping destination of the order, and the like.

In the above example, if the Shipping System (e.g., the supplier trading partner receiving messages from the customer trading partner) processes these "Order Update" messages delivered out of sequence, the Shipping System can end up with potentially inconsistent data or can run into a data corruption situation. The mishandled order or mishandled shipping can damage the business relationship between the trading partners, lead to lost opportunities and lost sales, or could ultimately lead to legal issues and recriminations.

Thus, what is required is a solution that can intelligently reconcile an initial order between two partners with any subsequently following order updates. The required solution should intelligently handle distributed communications networks where entities commonly communicate with each other asynchronously. The present invention provides a novel solution to the above requirements.

SUMMARY

Embodiments the present invention provide a solution that can intelligently reconcile an initial order between two partners with any subsequently following order updates. Embodiments of the present invention can intelligently handle distributed communications networks where entities commonly communicate with each other asynchronously, where the sequence of arriving business objects cannot be guaranteed.

In one embodiment, the present invention is implemented as a computer implemented method for processing business transaction objects received asynchronously. The method includes receiving a first message for a business object, the business object comprising, for example, an order, between a first party and a second party, and storing the business object including a first entity within a data store. The business object can be implemented as an instance that encompasses and describes aspects of a given business transaction (e.g., the provision of a product or service, etc.). The method further includes receiving a second message for the business object including a second entity, and storing the second entity with the business object. As orders are received, for example, they are associated with and stored with their respective business object within the receiving system. Respective chronological indicators for the first entity and the second entity are examined. Based on the chronological indicators, object attribute metadata describing a current status of the business object is updated, and the business object is processed in accordance with the updated object attribute metadata. The chronological indicators are associated with the entities of the business object on a per entity basis, irrespective of whichever particular message may have conveyed the entity and/or business object. Accordingly, a single message can convey multiple entities, with each entity having its own respective chronological indicator.

In one embodiment, the current status as indicated by the object attribute metadata is generated by examining an incremental difference between the entities associated with the business object. In such an embodiment, redundant information between the business parties need not be transmitted. For example, the sending party only sends messages comprising those entities that have changed or updated information. The receiving engine 330 will process on the incremental new information (e.g., the "delta") and derive the current status. If a message that was sent with an entity having a higher chronological indicator is received first, all the remaining business objects' entities in earlier messages with lesser chronological indicators less than this message's business object's entities will be ignored. Thus, the messages conveying the business object updates can be smaller because the full business object does not have to be transmitted every time there is a update or change in one or more of its entities.

In this manner, multiple orders can be asynchronously received by the receiving entity. The chronological indicator of each of the business objects and its entities allows the compilation and processing of accurate and correct current status information. Thus, the business objects can be received out of order and at different times, but the correctness of the object attribute metadata is assured, and the correct fulfilling of the business transaction is assured.

Consequently, even in those situations where the messages conveying the business object updates are received in order, embodiments of the present invention provide an assurance that object attribute metadata will be correct. This is important even in such cases because there may be no immediately available means for either party to promptly and reliably ascertain what the correct order is, and whether or not the correct order has in fact occurred.

BRIEF DESCRIPTION OF THE DRAWINGS

The present invention is illustrated by way of example and not by way of limitation, in the Figures of the accompanying drawings and in which like reference numerals refer to similar elements and in which.

DETAILED DESCRIPTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "communicating" or "instantiating" or "registering" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

Figure 1:
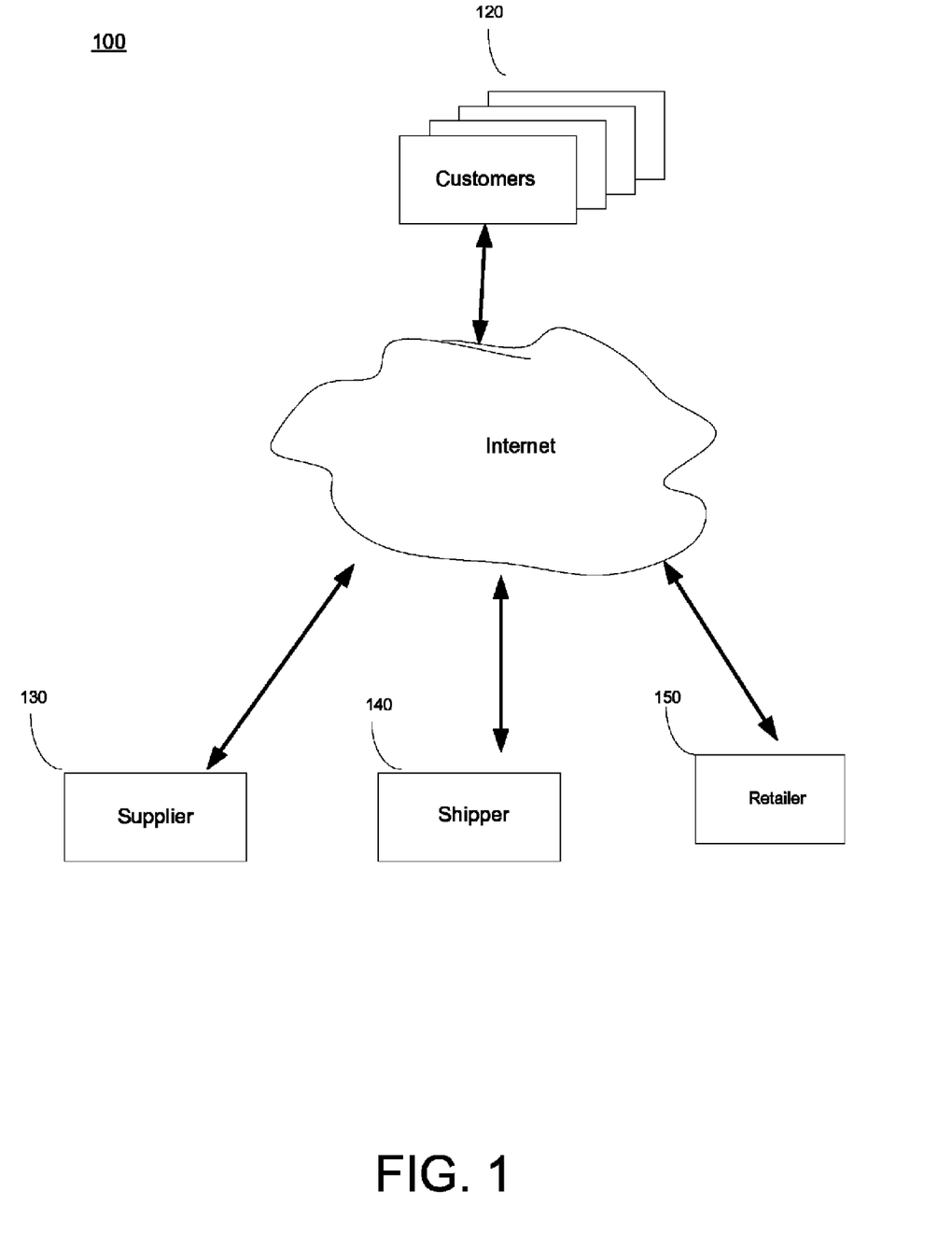
FIG. 1 shows a diagram of an exemplary system for processing business transaction orders received asynchronously in accordance with one embodiment of the present invention.

FIG. 1 shows an overview diagram of an exemplary system 100 for processing business transaction orders received asynchronously in accordance with one embodiment of the present invention. As depicted in FIG. 1, system 100 illustrates the relationships and the communications that are implemented between a plurality of customers 120, a supplier 130, a shipper 140, and a retailer 150, each coupled to communicate via the Internet.

The system 100 embodiment of FIG. 1 illustrates parties that have various needs to reconcile multiple orders and business transactions between any respective two parties. In such situations, the two parties need to intelligently handle certain asynchronous aspects and certain latency aspects that tend to be common with widely distributed communications networks, such as the Internet.

In the FIG. 1 embodiment, system 100 comprises a computer implemented method for processing business transaction order messages received asynchronously. As is commonly encountered during e-commerce scenarios, such order messages can be between any two of the entities depicted. For example, in order to fill an order from one of the customers 120, the supplier 130 may need to exchange various order transaction messages with the shipper 140. Similarly, the retailer 150 may need to exchange a number of order transaction messages with both the supplier 130 and the shipper 140. Scenarios include, for example, one of the customers 120 ordering an earthmoving machine from the retailer 150, who in turn transmits order information to the supplier 130 (e.g., a tractor manufacturer). The supplier 130 then transmits order information to the shipper 140 regarding the shipping requirements, destination, and other such relevant shipping information.

An objective of embodiments the present invention is to intelligently reconcile an initial order between any two of the parties 120-150 with any subsequently following order updates. The widely distributed nature of the communications network that is the Internet commonly makes the delivery and reception of messages occur asynchronously and out of sequence. In order to efficiently and correctly process a given business transaction, an order handling system needs to be able to reconcile one or more order messages that may be received out of sequence with respect to other order messages for the transaction.

Figure 2:
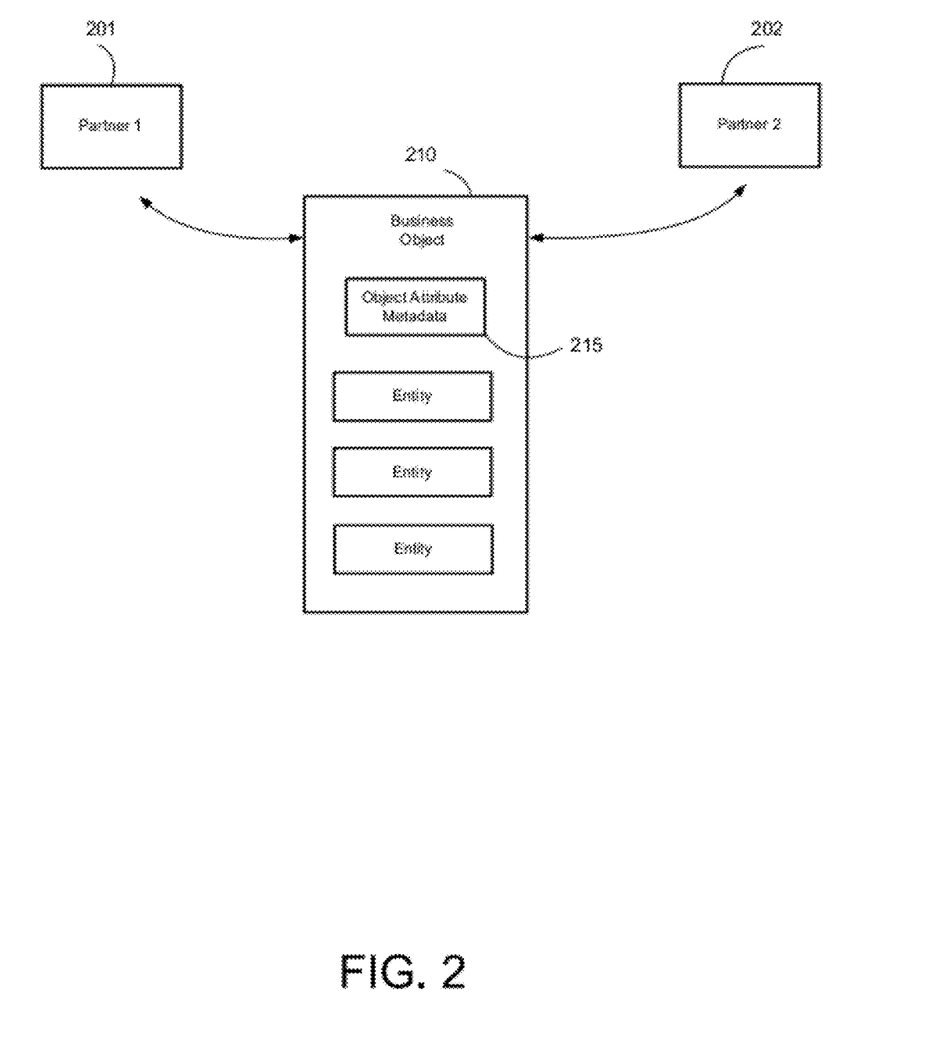
FIG. 2 shows a diagram illustrating a first partner and a second partner and an instantiation of a business object between them in accordance with one embodiment of the present invention.

FIG. 2 shows a diagram illustrating a first partner 201 and a second partner 202 and the instantiation of a business object 210 between them in accordance with one embodiment of the present invention. As depicted in FIG. 2, the first and second partners 201-202 can be any two of the parties 120-150 illustrated in FIG. 1.

The FIG. 2 embodiment shows the business object 210 that describes the business transaction that occurs between the first partner 201 and the second partner 202. Between any two entities, a business transaction that occurs between the entities can be described as a business object. The business object is intended to encompass all of the attributes and all of the information required to implement and fulfill a business transaction occurring between the two partners. Examples of a business objects include purchase orders, contracts, and the like.

The business object 210 is exchanged between the two partners 201-202 by means of a message. As used herein, a message refers to the transmission of a business object through the communications network. A message can include more than one business object. If a subsequent message is sent for an existing business object, it can convey the changes/updates to that object.

The FIG. 2 embodiment shows a plurality of entities 221-223 within the business object 210. An entity refers to elements or individual components of a business object. For example, an order number 1234 can have three items (e.g., three books, three erasers, and two pencils); these items are entities. The entities themselves can also be a composition of sub-entities, depending upon the data structure. For example, the order number 1234 can have a "hold" or a "lay away" field; these fields are sub-entities. In one embodiment, the order itself can be considered as comprising an order header (e.g., customer, general information such as the default shipped to address, etc.) and order lines (e.g., items with quantities, individual ship to addresses, etc.).

The FIG. 2 embodiment shows the object attribute metadata 215 included within the business object 210. The attribute metadata comprises the properties and/or information details for the respective business object. Examples include quantities, customer, shipped to addresses, and the like. For example, attribute metadata can describe a case where the order of 1234 is for customer ABC, and the books entity has the quantity 3 with a ship to address of San Jose, Calif., and the other items in that order have a ship to address in San Francisco, Calif.

A business object update refers to changes made to an existing business object and one or more of its entities, including creation, update, and cancellation. For example, for the order 1234 having an entity for "pencils" with a quantity of 2, a business object update can change the entity for "pencils" such that its quantity is changed from 2 to 5. The initial business object update would be creation of the business object. Subsequent business object updates can describe the complete business object, or can have only those entities that are new or changed. One of the challenges that are handled by embodiments of the present invention are business object updates that arrive in messages that are out of sequence with respect to the order in which they were transmitted.

Figure 3:
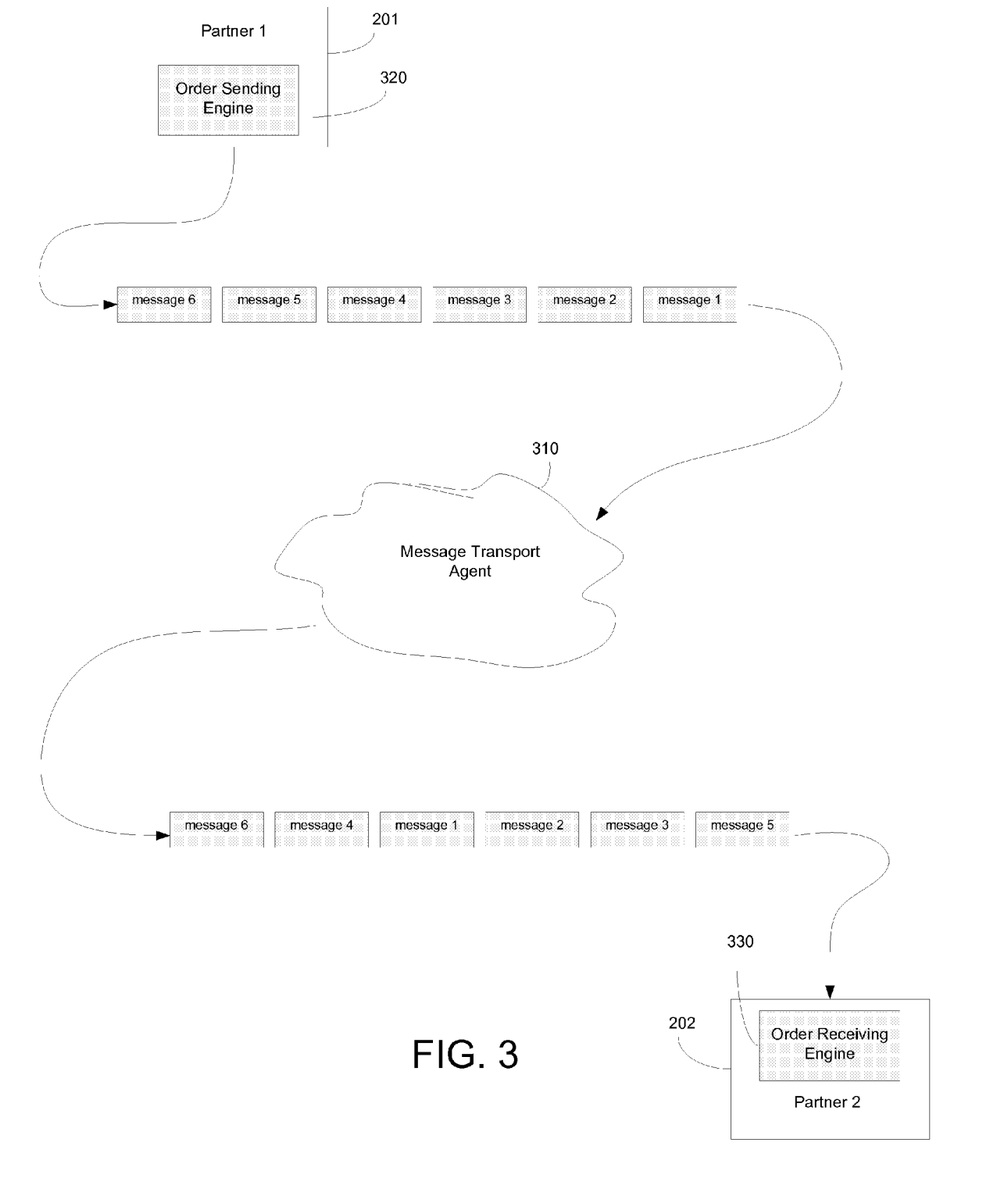
FIG. 3 shows an exemplary sequence of orders as they are transmitted from the first partner to a message transport agent, and the sequence of orders as they are received by the partner from the message transport agent in accordance with one embodiment of the present invention.

FIG. 3 shows an exemplary sequence of messages as they are transmitted from the first partner 201 to a message transport agent 310, and the sequence of messages as they are received by the partner 202 from the message transport agent 310 in accordance with one embodiment of the present invention.

A number of different factors can cause the messages that are transmitted from the partner 201 to be received by the partner 202 in an asynchronous manner. For example, referring to FIG. 1, the customer 120, the supplier 130, the shipper 140, and the retailer 150 can be very widely separated from one another (e.g., different time zones, different states, different countries, or the like). The parties 120-150 can each be using different communications equipment to access the Internet (e.g., real-time data entry versus off-line data entry, etc.). The parties 120-150 can have different business hours or can reside in different time zones. The end result of the asynchronous transmission of messages is the fact that the messages may be received out of sequence with respect to the manner in which they were transmitted. And since each of these messages affects the status of the business object 210, they need to be correctly handled regardless of the sequence in which they are received by either partner.

As shown in FIG. 3, the messages are transmitted from the first partner 201 by an order sending engine 320. The messages are received by the second partner 202 by an order receiving engine 330. The actual transmission of the messages between the first partner 201 and the second partner 202 is carried out by a message transport agent 310. In most scenarios, the message transport agent 310 incorporates the transmission of the messages across the Internet. Thus, even though the messages one through six may have been transmitted from the first partner 201 in the correct sequence, by the time they are handled by the message transport agent 310 and are received by the second partner 202, they can arrive out of sequence, as shown.

Figure 4:
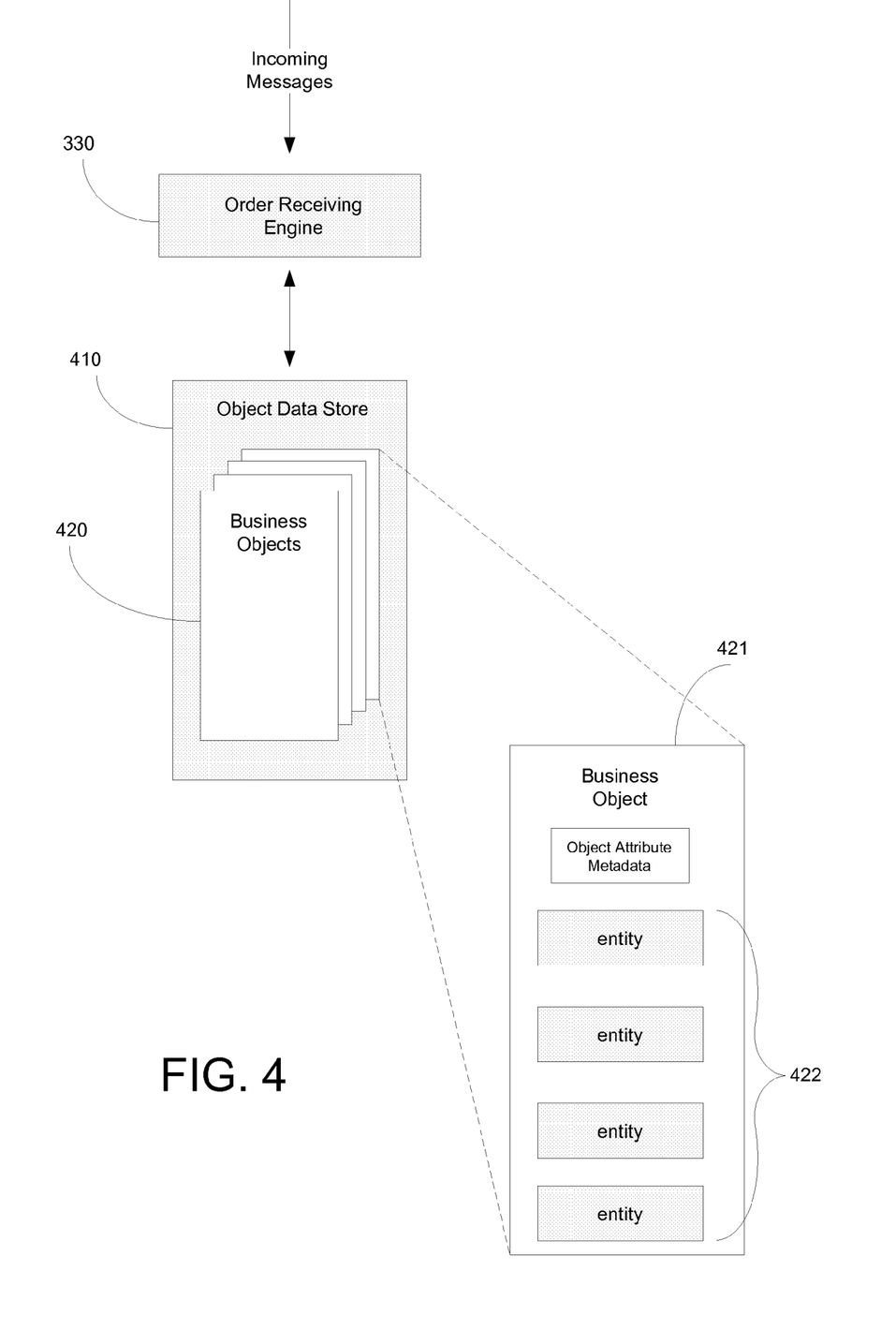
FIG. 4 shows a diagram illustrating incoming order updates as they are received by the order receiving engine in accordance with one embodiment of the present invention.

FIG. 4 shows a diagram illustrating incoming messages as they are received by the order receiving engine 330 in accordance with one embodiment of the present invention. As depicted in FIG. 4, the order receiving engine 330 interfaces with an object data store 410 that stores the multiple business objects 420. Business object updates are retrieved from incoming messages and are associated with their respective one of the business objects 420. As described above, each of the incoming messages include one or more business object updates. An example business object 421 is shown.

The order receiving engine 330 is implemented within a server computer system that includes software-based functionality that is configured to handle and process the incoming order updates (e.g., from the order sending engine 320). As described above, a business object is an instantiated construct containing the information encompassing and describing a given business transaction. The object data store 410 stores the various business objects of interest. An example business object 421 is shown. As described above, the business object 421 is shown with a number of included entities 422. As described above, each of these entities 422 describes certain aspects of the business object 421.

Figure 5:
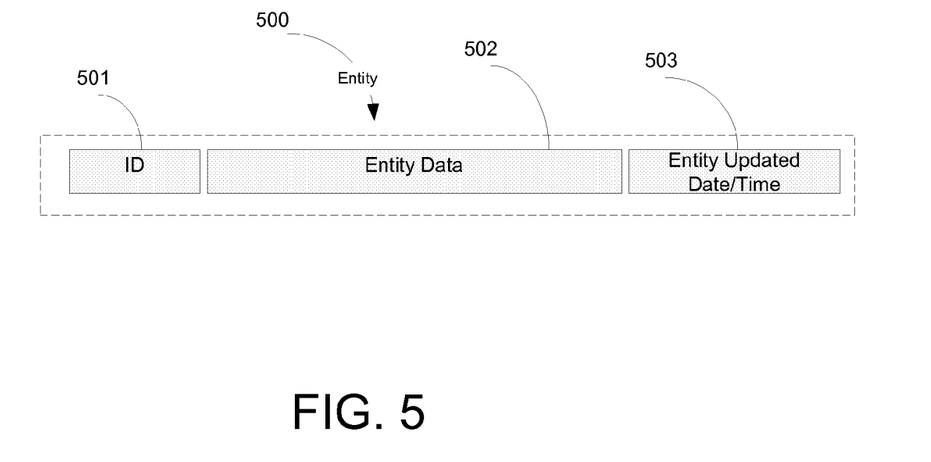
FIG. 5 shows a diagram of an exemplary order in accordance with one embodiment of the present invention.

FIG. 5 shows a diagram of an exemplary entity 500 in accordance with one embodiment of the present invention. As depicted in FIG. 5, the entity 500 includes an ID section 501, and entity data section 502, and a chronological indicator section 503 (e.g., Entity Updated Date/Time). In one embodiment, the entity is implemented as an XML document. As described above, as business object updates are received, they are associated with and stored with their respective business object. The entity 500 shows the chronological indicator 503 that is used to reconcile business object updates that are received out of sequence. The chronological indicator 503 can be implemented as an order date-time stamp that indicates the time at which the particular entity of the business object update was generated. This time should be of sufficient resolution and granularity to allow the entity 500 to be distinguished between any prior entities of prior business object updates and any subsequent entities for the business object. The entity ID section 501 is a unique identifier that references the individual business object to which the entity is associated. The entity data section 502 includes information regarding the handling and processing of the business transaction itself. Such information includes, shipping information, quantity information, payment information, and the like.

Figure 6:
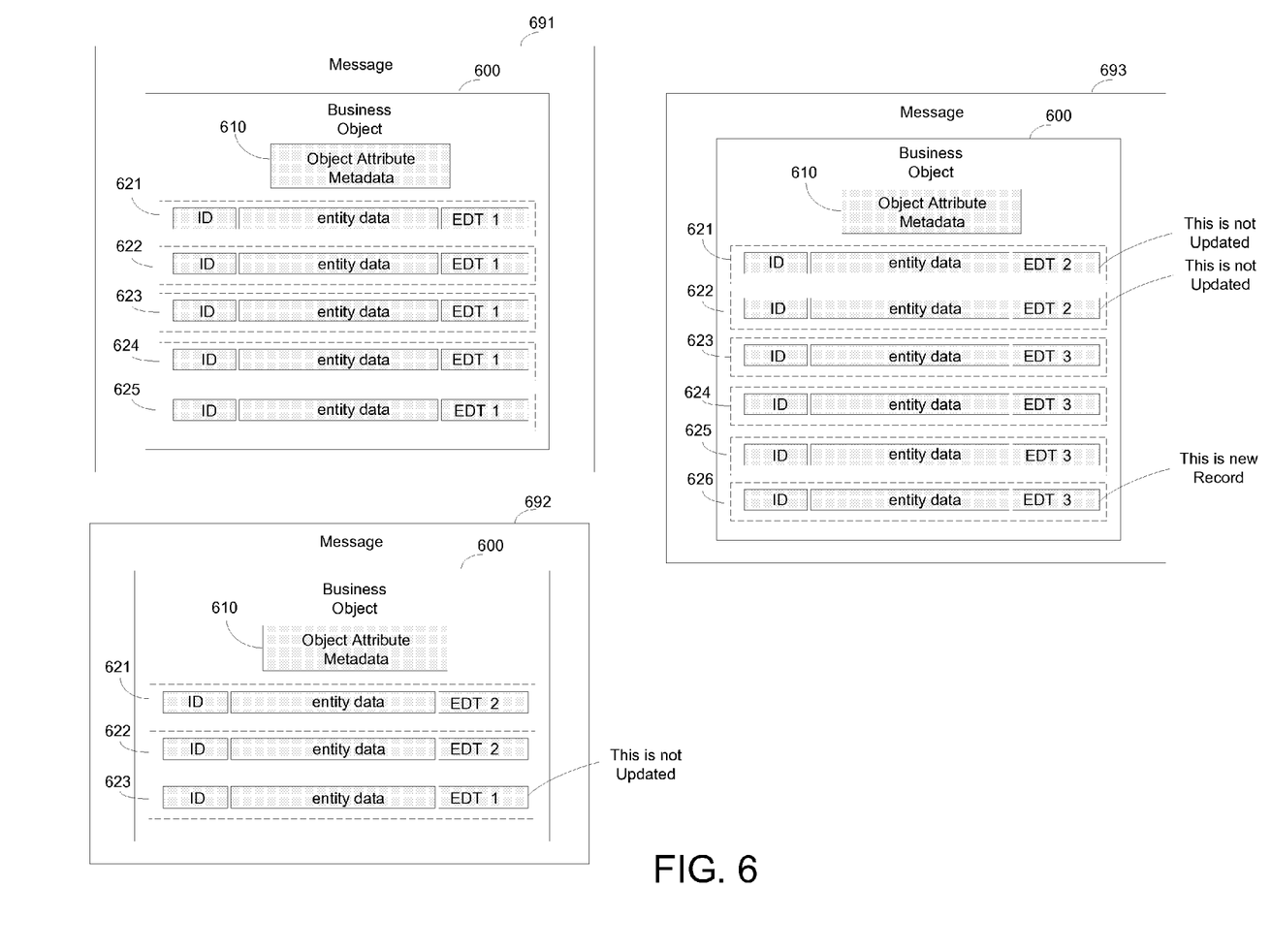
FIG. 6 shows exemplary messages for a business object and its associated object attribute metadata in accordance with one embodiment of the present invention.

FIG. 6 shows three exemplary messages 691-693 each containing an instance of business object 600 and its associated object attribute metadata 610 in accordance with one embodiment of the present invention. As depicted in FIG. 6, each of the messages 691-693 also includes one or more of the entities 621-626 that reference the business object 600.

As described above, as business object updates are received, they are associated with and stored with their respective business object within the receiving system (e.g., object data store 410 of FIG. 4). Each of the entities 621-626 include their respective chronological indicators, shown in FIG. 6 as the EDT (Entity Update Date and Time) sections. The chronological indicators are used to reconcile business object updates from messages arriving out of sequence. Based on the chronological indicators, the receiving engine 330 can correctly deduce the correct sequence for processing the multiple entities 621-626 that reference the common business object 600.

Figure 7:
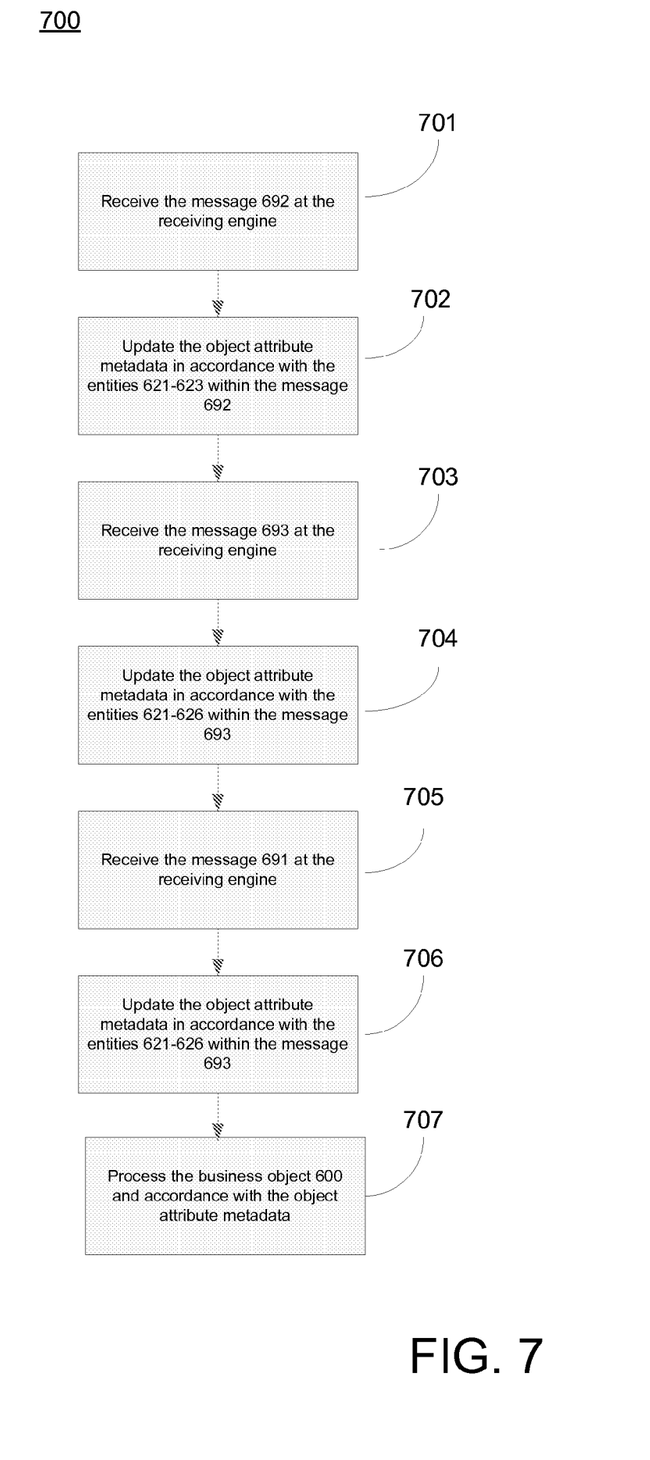
FIG. 7 shows a flowchart of the steps of a business object updating process in accordance with one embodiment of the present invention.

FIG. 7 shows a flowchart of the steps of a business object updating process 700 in accordance with one embodiment of the present invention. Process 700 shows the steps of an exemplary business object updating process, and is described in the context of the messages 691-693 of the diagram of FIG. 6.

Thus, in the example shown in FIG. 6, assume the messages 691-693 arrived in the sequence 692 first, 693 second, and 691 last by the receiving engine (e.g., receiving engine 330 illustrated in FIG. 3). This is in contrast to the correct sequence, message 691 first, message 692 second, and message 693 last. This can be seen by the respective chronological indicators of the entities of the messages. For example, the entities 621-625 of the message 691 have the earliest chronological indicators, EDT 1, and so on.

Accordingly, process 700 begins in step 701, where the message 692 is received by the receiving engine (e.g., receiving engine 330 illustrated in FIG. 3). In this example, the messages 691-693 arrived in the sequence message 692 first, message 693 second, and message 691 last at the receiving engine.

In step 702, the object attribute metadata 610 of the business object 600 is updated in accordance with the entities 621-623 of the message 692. When message 692 arrives first, the business object 600 and its entities 621, 622, 623 are processed by the receiving engine and stored in the receiving system. Since the message 692 is the first message received that includes the business object 600, the entities 621-623 have not been previously encountered, and thus each of the entities 621-623 are used to update the object attribute metadata. The receiving system also stores the chronological indicator, in this embodiment, the Entity Update Date Time.

In step 703, the message 693 is received by the receiving engine. In step 704, the object attribute metadata is updated in accordance with the entities 621-626 within the messages 693. Within the message 693, entities 621 and 622 have the same chronological indicators (e.g., EDT 2) as their counterparts within the message 692, and thus are ignored by the receiving engine. The entity 623 of message 693 has a more recent chronological indicator (e.g., EDT 3) than its counterpart in the message 692, and is therefore used to update the object attribute metadata of the message 693. The entities 624-626 are newly encountered, and thus are used to update the object attribute metadata of the message 693.

In step 705, the message 691 is received by the receiving engine. Subsequently, in step 706, the chronological indicators of the entities 621-625 included in message 691 are compared with their counterparts within the messages 693 and 692. The receiving engine sees that the chronological indicators of the entities 621-625 are not as recent as their counterparts, thus, the entities 621-625 of the messages 691 are ignored.

In step 707, the business object 600 is processed in accordance with the updated information of the object attribute metadata 610. The business object can be processed with the assurance that even though the messages 691-693 may be received out of sequence and in an arbitrary order, the object attribute metadata information regarding the business object 600 is reliable.

Thus, it should be noted that when message 693 is received, entities 621, 622 are ignored as the message 693 contained the same entities with lower or same timestamp and only the remaining entities 623, 624, 625 and 626 are processed and absorbed into the receiving system. As it can be noticed even though entity 623 was present in message 692, the receiving party consumes entity 623 from message 693 as well because its "Entity Update Date Time" is higher in message 693. Similarly, when message 691 is received, all the entities are ignored as the receiving system already received all of these entities with a higher or same timestamp.

In this manner, multiple business object updates and their constituent entities can be asynchronously received by the receiving party. The chronological indicator of each of the entities allows the compilation and processing of accurate and correct current status information. Thus, the business object updates can be received out of order and at different times, but the correctness of the object attribute metadata is assured, and the correct fulfilling of the business transaction is assured.

In contrast, referring still to the example shown in FIG. 6, if the messages 691-693 arrive in the correct order, for example, with message 691 arriving first, message 692 arriving second, and message 693 arriving last, the entities of each of the messages are processed in sequence. For example, the entities 621-625 of the first message 691 are stored by the receiving engine. The entities 621 and 622 of the second message 692 are updated into the receiving system in accordance with their more recent chronological indicators (e.g., EDT 2), while entity 623 is ignored. The entities 623-625 of the last message 693 are updated into the receiving system in accordance with their more recent chronological indicators (e.g., EDT 3), the entity 626 is also stored within the receiving system as a new entity, while the entities 621-622 are ignored. In both cases, where the messages 691-693 arrive in the correct sequence or out of sequence, the order updating process of the present invention provides assurance that the business object attribute metadata correctly reflects the current state of the business transaction.

Thus, it should be noted that each of the messages 691-693 can contain multiple entities, and each of these entities have their own respective chronological indicator. In this manner, the particular arrival time or transmission time of a given message is divorced from any effect upon the chronological indicator of the entities conveyed by that message. One message can have multiple entities, each having multiple different respective chronological indicators. In this manner, regardless of whether the messages 691-693 arrive in the correct sequence or out of sequence, the order updating process uses the per entity chronological indicators to ensure that the business object attribute metadata correctly reflects the current state of the business transaction.

Referring still to FIG. 6, in one embodiment, the current status as indicated by the object attribute metadata 610 is generated by examining an incremental difference between the entities 621-626 received in different message instances. In such an embodiment, redundant information between the entities 621 and 626 is not transmitted by the sending ignored by the receiving party. The sending party only sends can also opt to send those entities 621-626 that have changed or updated information. The order receiving engine 330 will process on the incremental new information (e.g., the "delta") and derive the current status. As described above, the occurrences of orders entities 621-626 are placed either processed or ignored in different messages based on their chronological indicators stored in the receiving system and the ones sent in the messages. Thus, the Messages conveying the business object updates can be smaller because the full business object does not have to be transmitted every time there is a update or change in one or more of its entities.

For example, assume a case where partner 1 places an order 1234 with partner 2 at 10 a.m. for 5 items (e.g., 2 notebooks, 1 eraser, 4 chalk, 10 papers, and 5 pencils). Partner 2 stores the instantiated business object in his system. At 11 a.m., partner 1 updates the order 1234 with a message indicating 10 pencils and 1 new ruler on the order 1234 without having to list the other items in the order. The timestamps on the entities are set to 11 am. At 1 p.m., partner 1 sends another message saying he only wants 3 pencils (timestamp 1 pm). At 4 pm, partner 2 checks his received messages (e.g., going from the newer to the older) and updates the order 1234 based on the message is received from partner 1. Partner 2 thus updates order 1234 for 3 pencils and a new ruler as determined by the timestamps. Thus, the order 1234 has 2 notebooks, 1 eraser, 4 chalk, 10 papers, 3 pencils, and 1 ruler, even though the previous two messages do not fully describe the order.

A case where an order confirmation is desired is now described. For example, assume a case where partner 1 has updated the order 1234 (timestamp 1 p.m.) before partner 2 checks his received messages. At this point, supposed partner 1 wants to confirm the status of his order. At 2 pm, partner 1 leaves another message to fully describe the order 1234 with these items: 2 notebooks (timestamp 10 am), 1 eraser (timestamp 10 am), 4 chalk (timestamp 10 am), 10 papers (timestamp 10 am), 3 pencils (timestamp 1 pm), and 1 ruler (timestamp 11 am). Subsequently, partner 2 could process this fully detailed message by comparing the timestamps with his system's timestamps. Partner 2 will know he only needs to process the pencils (quantity changed) and the ruler (new item), since the other items haven't been updated since timestamp 10 am. Partner 2 can then skip the items in the intervening messages because their timestamps are earlier or the same.

In this manner, the timestamps allow the messages sent between partner 1 and partner 2 to be much smaller. For example, consider a case where 10 orders have been placed with 5 items each. The first message would send all 50 items in their respective 10 orders. Suppose each item takes about 1 KB in the message, the total message would be about 50 KB. If the orders are later updated by adding 5 new items and changing attributes on 3 items, a message can be sent for these 8 entities, which would total about 8 KB, instead of transmitting a full message that would be 55 KB. In this manner, embodiments of the present invention can scale up for a message with multiple business object updates even when the messages get processed completely out of sequence, since the older or unchanged entity records can be skipped.

Accordingly, in one embodiment, the order receiving engine 330 is configured to only store the relevant new information that is included in each of the entities 621-626. In such an embodiment, redundant information is discarded and is not stored within the data store (e.g., the object data store 410). This aspect reduces the amount of storage required since only that order information which is new (e.g., lines of order data that is new or that changes previous lines of order data) is stored.

In one embodiment, the current status of the business object 600 is determined by identifying the last in sequence order that references the business object 600. In such embodiment, each of the entities 621-626 describes the complete state of the business object 600. As new order updates arrive, the earlier in sequence orders can be ignored or discarded. For example, each subsequent order received includes the agreed-upon attributes regarding the business object 600. This allows the earlier orders to be ignored or discarded.

In this manner, embodiments of the present invention can implement server-based a receiving system for synchronizing business transaction records from asynchronous messages received out of sequence. The receiving system can store the multiple business transaction records for a business transaction and associate the records with the business object. For each of the records, the receiving system examining respective chronological indicators of the records as described above to determine a time at which a corresponding record was generated. The chronological indicators are generated by a sending entity. Based on the chronological indicators, the records are processed to obtain a current status of the business transaction, and the business transaction is then processed in accordance with the determined current status.

Figure 8:
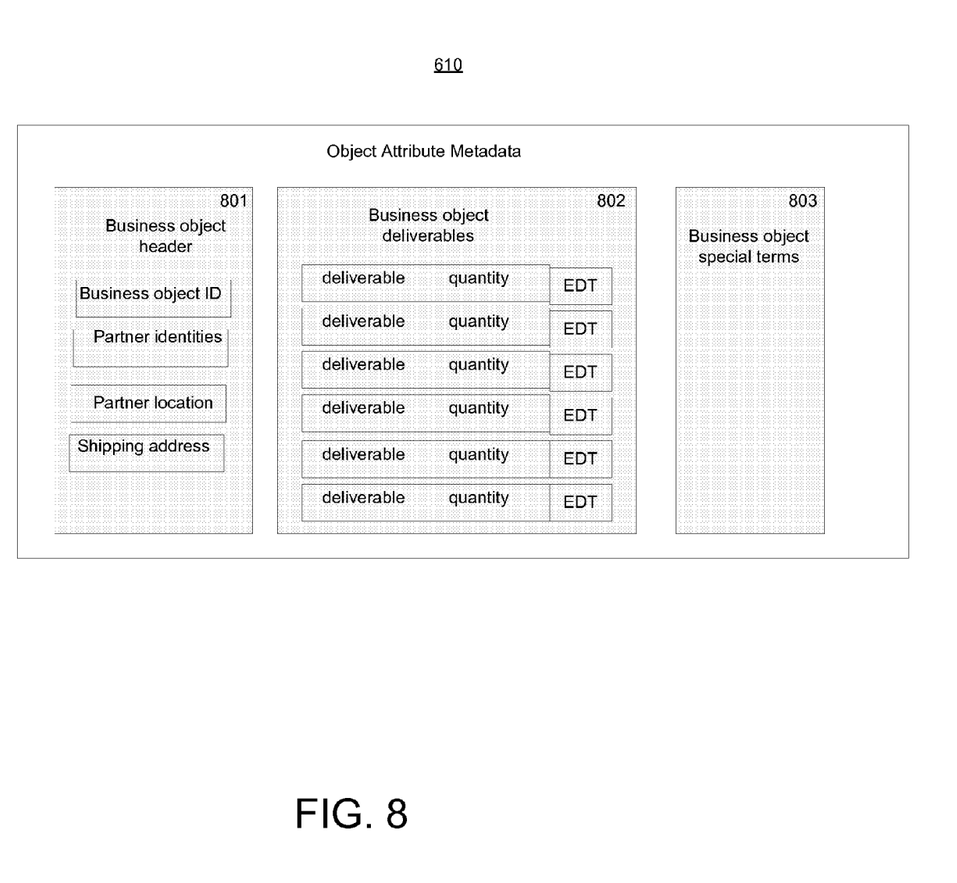
FIG. 8 shows exemplary components of business object attributes in accordance with one embodiment of the present invention.

FIG. 8 shows a diagram showing the exemplary components of the object attribute metadata 610 in accordance with one embodiment of the present invention. As described above, the object attribute metadata 610 is updated in accordance with the chronological indicators of each of the entities received in the messages 691-693. The FIG. 8 embodiment shows an exemplary diagram of the components comprising the object attribute metadata 610.

In the FIG. 8 embodiment, the object attribute metadata 610 includes a business object header 801, business object deliverables 802, and business object special terms 803 as shown. The business object header includes identifying information descriptive of the deliverables in terms of the transaction represented by the business object. As shown in FIG. 8, the business object header includes business object ID (e.g., a unique identifier referencing the business object), partner identities (e.g., the name of the company that is party to the transaction, etc.), partner location (e.g., mailing address and/or business address of the partner), and the shipping address (e.g., one or more shipping addresses of the deliverables). The business object deliverables 802 includes the deliverables as indicated by the entities received via the messages (e.g., via the messages 691-693 a FIG. 6). Each deliverable has a corresponding quantity and a corresponding chronological indicator (e.g., Entity Date and Time). The business object special terms 803 includes any terms or notes that may further specify the business transaction beyond the information already contained within the best subject header 801 in the business object deliverables 802. For example, the business object special terms could include special payment instructions (e.g., debit accounts, etc.), instructions for out of stock conditions, or the like.

Computer System Environment

Figure 9:
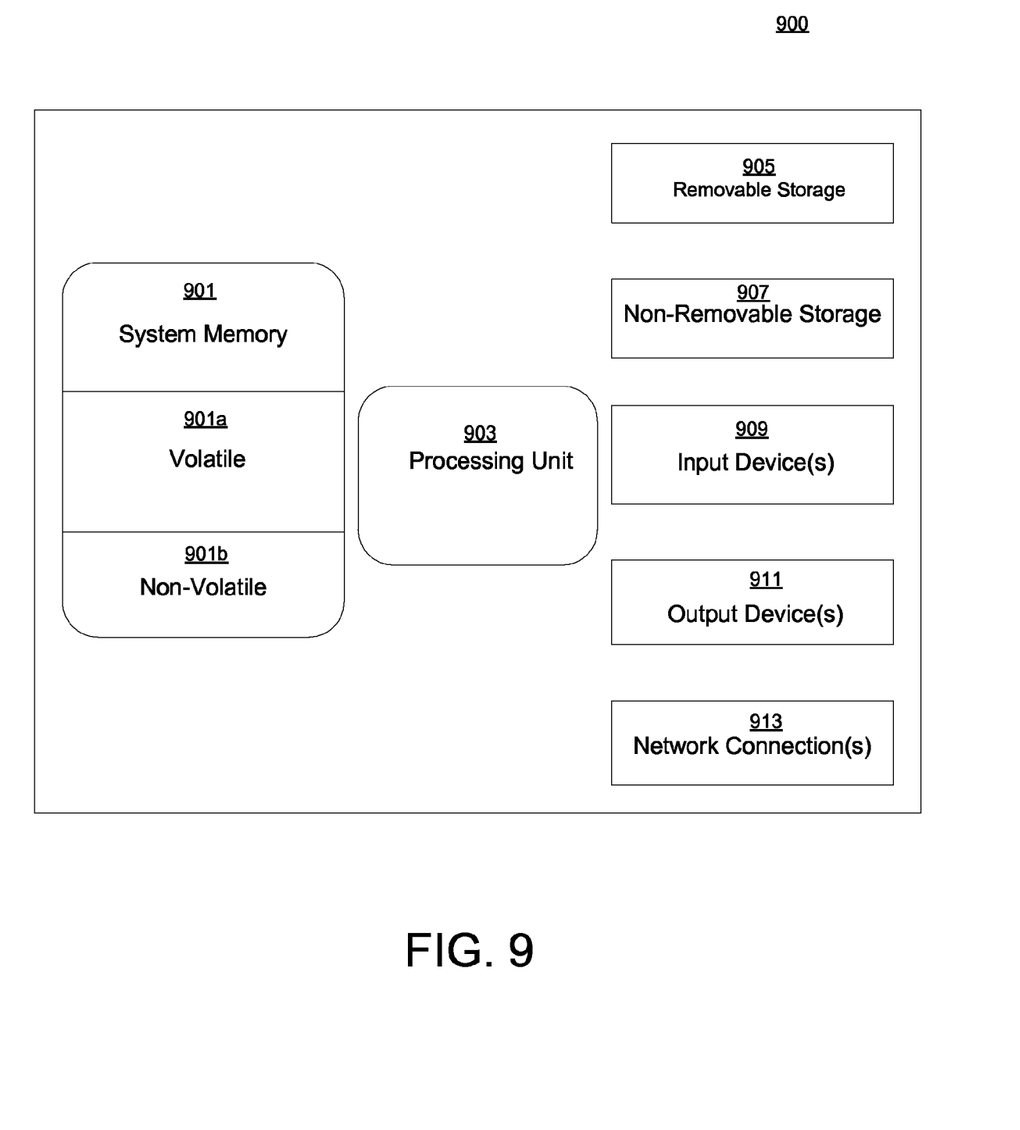
FIG. 9 shows the components of an exemplary computer system in accordance with one embodiment of the present invention.

FIG. 9 shows an exemplary computer system 900 according to one embodiment. Computer system 900 depicts the components of a basic computer system providing the execution environment for certain hardware-based and software-based functionality for the above described embodiments. For example, computer system 900 can be a system upon which the order receiving engine 330 from FIG. 3 is instantiated. Computer system 900 can be implemented as, for example, a desktop computer system, laptop computer system or server computer system. Similarly, computer system 900 can be implemented as a handheld device. Computer system 900 typically includes at least some form of computer readable media. Computer readable media can be a number of different types of available media that can be accessed by computer system 900 and can include, but is not limited to, computer storage media.

In its most basic configuration, computer system 900 typically includes processing unit 903 and memory 901. Depending on the exact configuration and type of computer system 900 that is used, memory 901 can be volatile (e.g., such as DRAM, etc.) 901a, non-volatile 901b (e.g., such as ROM, flash memory, etc.) or some combination of the two.

Additionally, computer system 900 can include mass storage systems (e.g., removable 905 and/or non-removable 907) such as magnetic or optical disks or tape. Similarly, computer system 900 can include input devices 909 and/or output devices 911 (e.g., such as a display). Computer system 900 can further include network connections 913 to other devices, computers, networks, servers, etc. using either wired or wireless media. As all of these devices are well known in the art, they need not be discussed in detail.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for processing business transaction orders received asynchronously, comprising:

receiving at a computer system a first message for a business object at a first time, the business object comprising an order between a first party and a second party and the first message including a first entity for the order and a chronological indicator of a time at which the first entity was generated;

storing by the computer system the business object including the first entity within a data store;

receiving at the computer system a second message for the business object at a second time, the second message including a second entity for the order and a chronological indicator of a time at which the second entity was generated, wherein the second time is later than the first time and the time at which the second entity was generated is later than the time at which the first entity was generated;

storing by the computer system the second entity with the business object;

receiving at the computer system a third message for the business object at a third time, the third message including a third entity for the order and a chronological indicator for a time at which the third entity was generated, wherein the third time at which the third message is received is later than the second time at which the second message is received and the time at which the third entity was generated is earlier than the time at which the second entity was generated;

storing by the computer system the third entity with the business object; and synchronizing by the computer system records of the order, wherein synchronizing comprises obtaining a current status of the first entity, second entity, and third entity and in order of the chronological indicators for the time at which each of the first entity, second entity, and third entity are generated, updating object attribute metadata describing the current status of the business object based on the obtained current status of the first entity, second entity, and third entity, and processing the business object in accordance with the updated object attribute metadata.

2. The method of claim 1, wherein the first message, the second message, and the third message are received asynchronously via a distributed communications network.

3. The method of claim 2, wherein the first message is an initial order and the second message and the third message are updates to the initial order.

4. The method of claim 1, wherein the first entity, the second entity, and the third entity include respective identifiers indicating correspondence to the business object.

5. The method of claim 1, wherein the first entity, the second entity, and the third entity include respective entity data indicating instructions regarding the processing of the business object.

6. The method of claim 1, wherein the chronological indicators are generated by an order sending engine at a sending party.

7. The method of claim 1, wherein the business object is a sales transaction for a provision of a product or a service from a first party to the second party.

8. A system for synchronizing and processing business transaction records from asynchronous messages received out of sequence, the system comprising:
 a processor; and
 a memory communicatively coupled with and readable by the processor and having stored therein a sequence of instruction which, when executed by the processor, cause the processor to process the business transaction records by:
  receiving a first message for a business object at a first time, the business object comprising an order between a first party and a second party and the first message including a first entity for the order and a chronological indicator of a time at which the first entity was generated;
  storing the business object including the first entity within a data store;
  receiving a second message for the business object at a second time, the second message including a second entity for the order and a chronological indicator of a time at which the second entity was generated, wherein the second time is later than the first time and the time at which the second entity was generated is later than the time at which the first entity was generated;
  storing the second entity with the business object;
  receiving a third message for the business object at a third time, the third message including a third entity for the order and a chronological indicator for a time at which the third entity was generated, wherein the third time at which the third message is received is later than the second time at which the second message is received and the time at which the third entity was generated is earlier than the time at which the second entity was generated;
  storing the third entity with the business object; and
  synchronizing records of the order, wherein synchronizing comprises obtaining a current status of the first entity, second entity, and third entity and in order of the chronological indicators for the time at which each of the first entity, second entity, and third entity are generated, updating object attribute metadata describing the current status of the business object based on the obtained current status of the first entity, second entity, and third entity, and processing the business object in accordance with the updated object attribute metadata.

9. The system of claim 8, wherein the first message the second message, and the third message are received asynchronously via a distributed communications network.

10. The system of claim 9, wherein the first message is an initial order and the second message and the third message are updates to the initial order.

11. The system of claim 8, wherein the first entity the second entity, and the third entity include respective identifiers indicating correspondence to the business object.

12. The system of claim 8, wherein the first entity the second entity, and the third entity include respective entity data indicating instructions regarding the processing of the business object.

13. The system of claim 8, wherein the chronological indicators are generated by an order sending engine at a sending party.

14. The system of claim 8, wherein the business object is a sales transaction for a provision of a product or a service from a first party to a second party.

15. A computer-readable memory having stored thereon a sequence of instruction which, when executed by a processor, cause the processor to synchronize and process business transaction records from asynchronous messages received out of sequence by:
 receiving a first message for a business object at a first time, the business object comprising an order between a first party and a second party the first message including a first entity for the order and a chronological indicator of a time at which the first entity was generated;
 storing the business object including the first entity within a data store;
 receiving a second message for the business object at a second time, the second message including a second entity for the order and a chronological indicator of a time at which the second entity was generated, wherein the second time is later than the first time and the time at which the second entity was generated is later than the time at which the first entity was generated;
 storing the second entity with the business object;
 receiving a third message for the business object at a third time, the third message including a third entity for the order and a chronological indicator for a time at which the third entity was generated, wherein the third time at which the third message is received is later than the second time at which the second message is received and the time at which the third entity was generated is earlier than the time at which the second entity was generated;
 storing the third entity with the business object; and
 synchronizing records of the order, wherein synchronizing comprises obtaining a current status of the first entity, second entity, and third entity and in order of the chronological indicators for the time at which each of the first entity, second entity, and third entity are generated, updating object attribute metadata describing the current status of the business object based on the obtained current status of the first entity, second entity, and third entity, and processing the business object in accordance with the updated object attribute metadata.

16. The computer-readable memory of claim 15, wherein the first message is an initial order and the second message and the third message are updates to the initial order.

17. The computer-readable memory of claim 15, wherein the first entity the second entity, and the third entity include respective identifiers indicating correspondence to the business object.

18. The computer-readable memory of claim 15, wherein the first entity the second entity, and the third entity include respective entity data indicating instructions regarding the processing of the business object.

19. The computer-readable memory of claim 15, wherein the chronological indicators are generated by an order sending engine at a sending party.

20. The computer-readable memory of claim 15, wherein the business object is a sales transaction for a provision of a product or a service from a first party to a second party.

* * * * *

UNITED STATES PATENT AND TRADEMARK OFFICE
CERTIFICATE OF CORRECTION

| | |
|---|---|
| PATENT NO. | : 8,301,592 B2 |
| APPLICATION NO. | : 12/062386 |
| DATED | : October 30, 2012 |
| INVENTOR(S) | : Vishnuvajhala et al. |

It is certified that error appears in the above-identified patent and that said Letters Patent is hereby corrected as shown below:

In column 13, line 56, in Claim 9, delete "message" and insert -- message, --, therefor.

In column 13, line 62, in Claim 11, delete "entity" and insert -- entity, --, therefor.

In column 14, line 1, in Claim 12, delete "entity" and insert -- entity, --, therefor.

In column 14, line 51, in Claim 17, delete "entity" and insert -- entity, --, therefor.

In column 14, line 55, in Claim 18, delete "entity" and insert -- entity, --, therefor.

Signed and Sealed this
Twenty-ninth Day of January, 2013

David J. Kappos
*Director of the United States Patent and Trademark Office*